United States Patent [19]

Berg

[11] Patent Number: 4,838,597
[45] Date of Patent: Jun. 13, 1989

[54] ARRANGEMENT IN TUBULAR PLATFORM STANCHIONS

[75] Inventor: Lars O. Berg, Billdal, Sweden

[73] Assignee: Armaton AB, Vara, Sweden

[21] Appl. No.: 116,699

[22] Filed: Nov. 4, 1987

[30] Foreign Application Priority Data

Nov. 4, 1986 [SE] Sweden .................................. 8604709

[51] Int. Cl.$^4$ ........................ B62D 27/06; B62D 33/04
[52] U.S. Cl. ........................................ 296/36; 296/43; 105/382
[58] Field of Search ............................. 296/36, 43, 53; 105/380, 382, 384, 390; 280/145, 147

[56] References Cited

U.S. PATENT DOCUMENTS 2,107,612  2/1938  Karlge .................................. 105/382

FOREIGN PATENT DOCUMENTS 498345  1/1951  Belgium .................................. 105/380
0005120  10/1979  European Pat. Off. .
0051575  5/1982  European Pat. Off. .
3247078  6/1984  Fed. Rep. of Germany ........ 296/36

Primary Examiner—Dennis H. Pedder
Attorney, Agent, or Firm—Finnegan, Henderson, Farrabow, Garrett & Dunner

[57] ABSTRACT

An arrangement for detachably mounting a platform stanchion on the edge surface of a truck platform comprises an attachment (10) which is permanently secured to said edge surface. The attachment has an upper and a lower horizontally projecting yoke (12 and 13, respectively). The rear wall (15) of the stanchion has at its lower end a tongue (20) insertable into the lower yoke (13), and an opening (25) adapted to be moved over the upper yoke (12), such that a locking key (23) can be pushed through the yoke on the stanchion side facing away from the edge surface. The wall surface of the stanchion facing said edge surface has a recess and, within the confines of said recess, a projection (22). The recess and the projection are dimensioned to receive the attachment (10) in the recess, such that the projection (22) extends through a hole in the attachment (10). As a result, the attachment surface connected with the platform edge, the stanchion wall surface on both sides of said recess, and the end surface of the projection (22) facing the platform edge lie in the same plane.

5 Claims, 4 Drawing Sheets

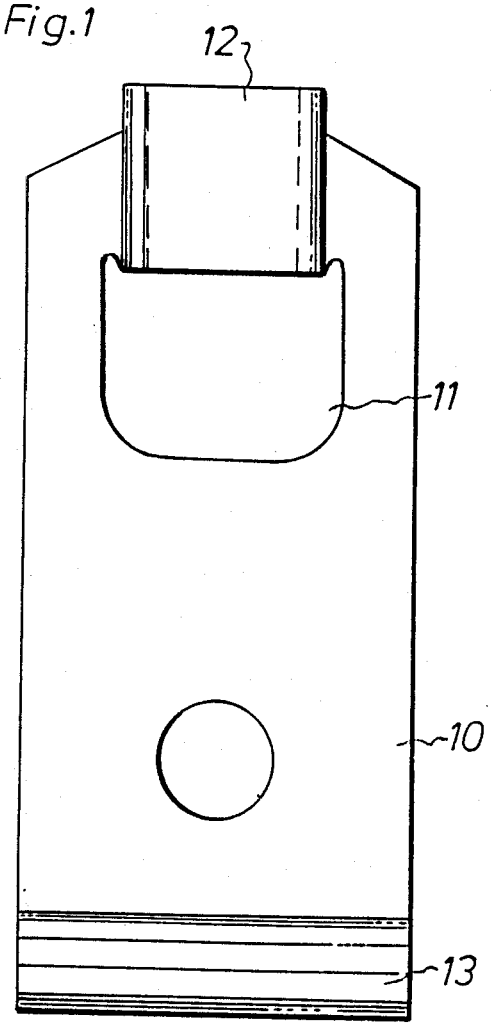

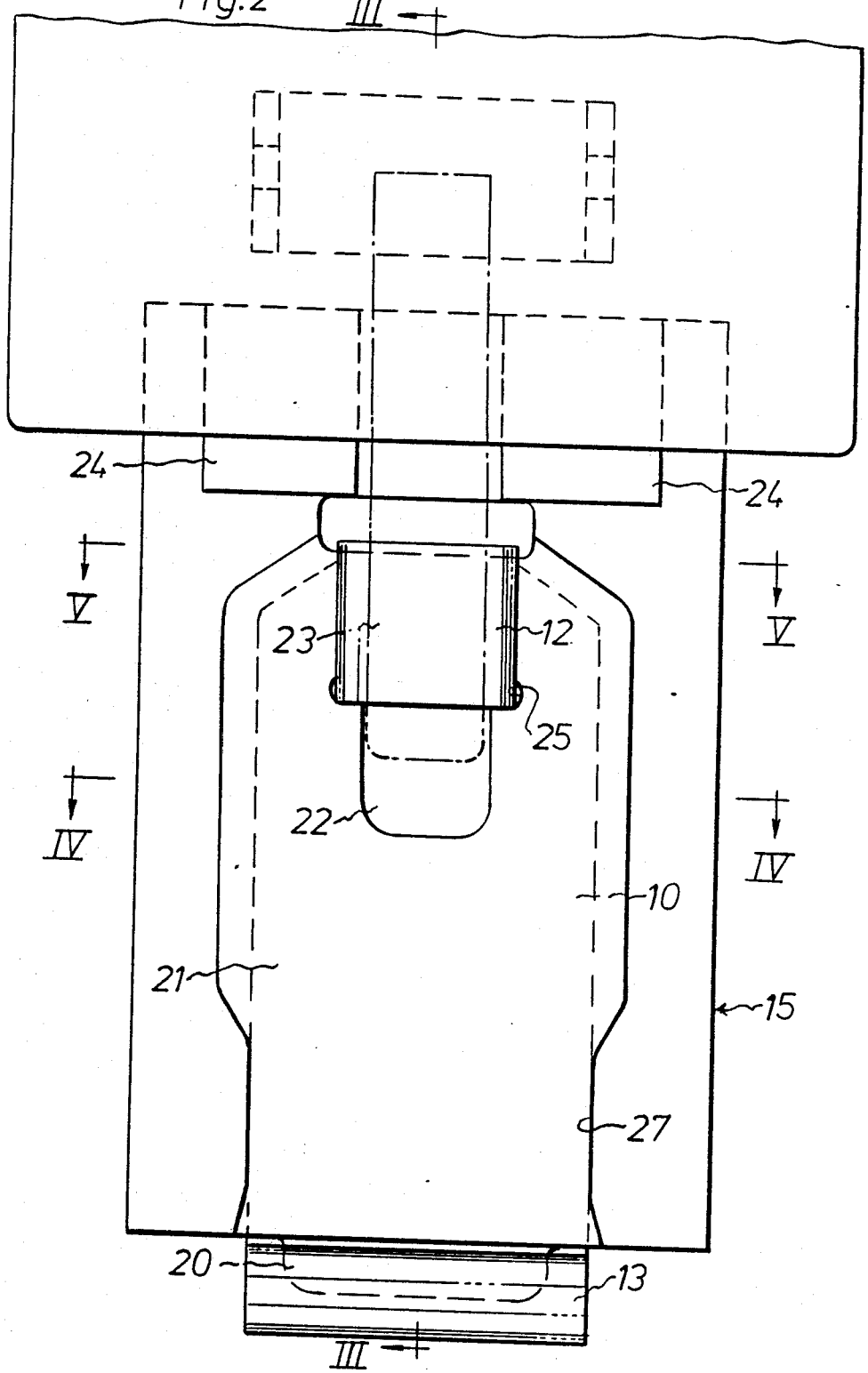

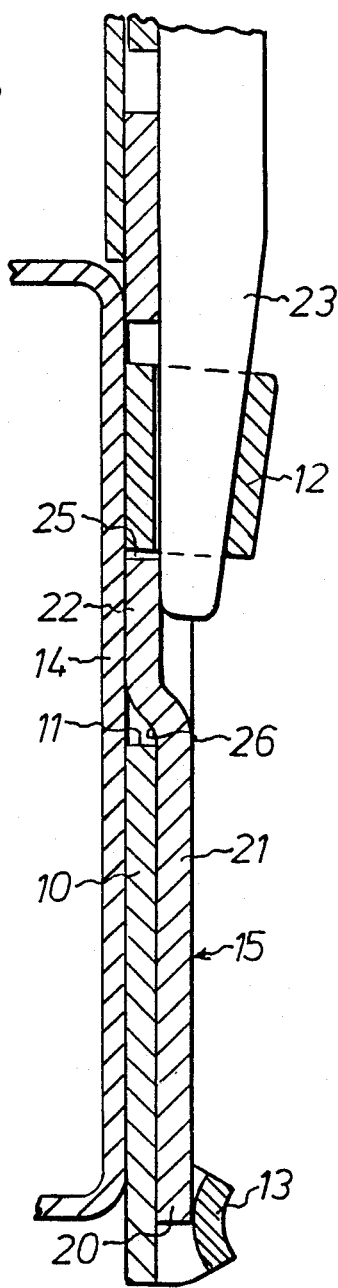

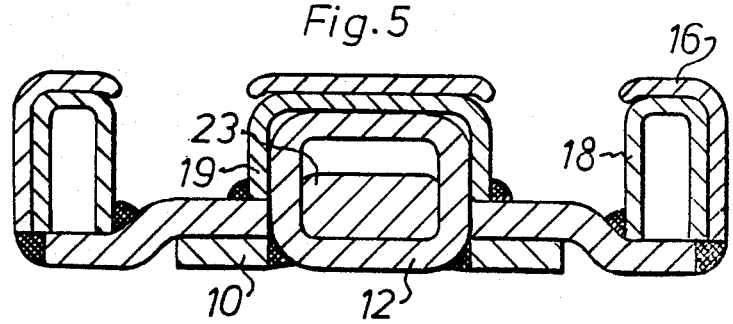
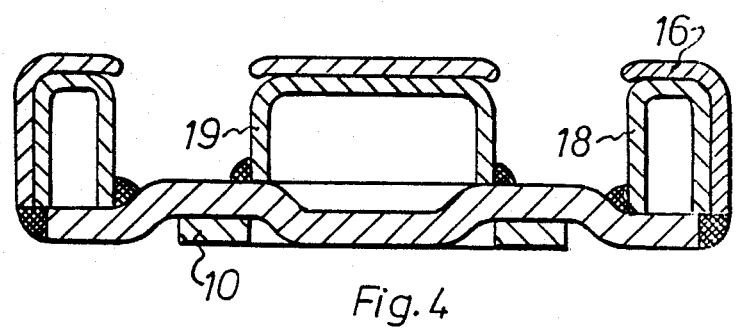

ARRANGEMENT IN TUBULAR PLATFORM STANCHIONS

The present invention relates to an arrangement in tubular platform stanchions for detachable mounting thereof on the edge surface of a truck platform by means of a wedge-shaped locking key manually displaceable in the stanchion.

The platform sides of trucks, trailers etc are retained in upright position by means of stanchions provided with catches which are manually displaceable out of the side surfaces and adapted to engage corresponding recesses in the short-side edge surfaces of the platform sides. The platform stanchions must be readily mountable and removable to facilitate loading and unloading. In principle, two different types of mounting devices occur.

In one of these types, the important part is an attachment which is permanently secured to the platform edge surfaces and has an upper and a lower horizontally projecting yoke. The attachment cooperates with a lower stanchion wall portion which, at its lower end, has a tongue insertable from above into the lower attachment yoke, and an opening which, when the stanchion portion is pivoted about said tongue and said yoke, is movable over the upper attachment yoke, such that the yoke is positioned opposite the locking key which can now be passed through the yoke to engage, with its forward part, the side of the stanchion wall portion facing away from the attachment, and to clamp said wall portion against the attachment. The other type of mounting device has no attachment, and instead the yokes are secured directly to the platform edge surface. The first-mentioned type gives the advantage that the attachment is always welded on in exact vertical position. On the other hand, it has the disadvantage that the forces from the stanchion to the chassis are transmitted via the attachment. In the other type of mounting device the attachment is secured directly to the platform edge surface which seldom follows a truly vertical line, and this means that the mounted stanchion will not be exactly vertical. In this embodiment, on the other hand, the forces are transmitted directly to the chassis, and furthermore the total height in the horizontal direction will be somewhat lower. Since one truck owner may prefer one of these embodiments and another trucker the other, the manufacturer must store both types of attachment.

The present invention aims at combining the advantages of the above-mentioned mounting devices into a single new embodiment. To this end, the stanchion wall portion is formed in its side facing the platform edge surface with a recess so dimensioned that the attachment is received therein with its rear surface, which is attached to the platform edge surface, on a level with the wall portion side on both sides of said recess, and below the opening, within the limits defined by the recess, with a projection which, with the attachemnt received in said recess, extends through a hole in the attachment into engagement with the platform edge surface and the attachment, respectively.

The invention will be described in more detail below, reference being had to the accompanying drawings illustrating an example. In the drawings FIG. 1 is a front view of an attachment for mounting a platform side stanchion on the platform edge surface of a truck;

FIG. 2 is a rear view of the platform stanchion that faces the platform;

FIGS. 3, 4 and 5 are sections along lines III—III, IV—IV, and V—V, respectively, in FIG. 2, FIGS. 4 and 5 also showing the stanchion side walls and front wall and a number of reinforcements which, for the sake of clearness, have been omitted in FIGS. 2 and 3.

FIG. 1 shows an attachment 10 in the form of an approximately rectangular steel plate intended to be secured to the platform edge surface of a truck, for example by welding along its longitudinal side edges. The attachment 10 has at its upper part an approximately rectangular opening 11 and above this opening a yoke 12 having a vertical through opening and an inclined front wall, as shown in FIG. 3. At its lower part, the attachment 10 has a further yoke 13 having a vertical slit-like through opening and transversely curved walls, as also shown in FIG. 3.

The attachment 10 according to FIG. 1 is adapted to accommodate a platform stanchion formed at its lower end in the manner shown in FIG. 2. The platform stanchion thus has a rear wall in the form of a steel plate, as well as a front wall 16 and side walls, as indicated in FIGS. 4 and 5, and reinforcements 18, 19 which are U-shaped in cross-section and provided along the longitudinal edges and the central portion for reinforcing the construction. The last-mentioned parts are not shown in FIGS. 2 and 3, to avoid unnecessary complication of the Figures. As indicated in FIGS. 4 and 5, the stanchion front wall 16 has elongated openings extending upwardly a distance from the lower stanchion end toward the opposite stanchion end in order to accommodate handles (not shown) for actuating locking mechanisms (not shown), as will be described below. The stanchion wall portion 15 is not planar, but has a central longitudinally extending raised portion 21 to form a recess 26 in the inwardly facing side of the wall portion, said recess having a height, width and length conforming to the corresponding dimensions of the attachment 10 for accommodation thereof in the manner illustrated in FIGS. 2 and 3. Along at least a portion of their length, the vertical edge surfaces of the recess 26 are closely adjacent to or engage the corresponding edge surfaces of the attachment, as shown at 27. At a distance from its lower end, within the limits defined by the raised portion 21 and the recess 26, respectively, the wall portion 15 has a through opening 25 and, underneath this opening, an approximately rectangular depression with a corresponding projecting portion 22 on the inwardly facing side of said wall portion. The recess 26 and the corresponding raised portion 21 on the opposite side of the wall portion, as well as the projecting portion 22 and the associated recess, are made by cold-pressing, although it is of course possible to weld the components together in order to obtain this configuration. Two shoulders or guides 24 are mounted above the opening 25, each on one side of the center line of the wall portion and at a mutual distance which is greater than the width of a locking key 23 which is movable in conventional manner in the longitudinal direction of the stanchion by means of the above-mentioned handles or by some other convenient mechanism. At its lower part, the wall portion 15, more particularly the raised portion 21 thereof, has a downwardly directed tongue 20 which is formed in one piece with the portion 21 and has downwardly facing rounded corners. As will appear from FIGS. 2 and 3, the tongue 20 is adapted to be inserted in the yoke 13 of the attachment.

The manner in which the platform stanchion according to the invention is mounted in an attachment 10 secured to the truck platform edge surface, is extremely simple. The stanchion is held so high that its tongue 20 is slightly above the lower yoke 13 of the attachment. Then the tongue 20 is inserted in the yoke 13, which can be done without difficulty because the front wall of the yoke 13 according to FIG. 3 has an outwardly curved outer wall, and the tongue 20 has rounded outer corners causing the tongue to feel its own way into the space defined by the yoke 13 also when the stanchion is inclined outwardly from the attachment 10. Then the stanchion is pushed inwardly towards the attachment into a vertical position so that the upper yoke 12 fits into the opening 25 of the wall portion 15 such that the yoke 12 will emerge on the outwardly facing side of the wall portion 15. At the same time, the attachment 10 is received by the recess 26 in the wall portion 15, as shown in FIGS. 2 and 3, and the projecting portion 22 in the recess of the wall portion 15 extends through the opening 11 of the attachment 10 into contact with the platform edge surface 14 carrying the attachment. The stanchion wall portion now engages the platform edge surface on both sides of the attachment 10 and also centrally therein, whereby an exceedingly favourable transmission of forces from the stanchion to the chassis is obtained. In the event that the platform edge surface is slightly inclined, but the attachment is exactly vertical, a space may be formed between the rear side of the attachment and the edge surface. Although the inner surface of the portion 22 in this case does not come into engagement with the edge surface, the requisite stability is still achieved in that the transition from the portion 22 to the wall surface will come into engagement with the outwardly facing surface of the attachment around the opening 11. Then the handle or mechanism (not shown) for operating the locking key 23 longitudinally movable in the stanchion is actuated. The locking key lies vertically above the opening 25 of the wall portion 15 between the shoulders 24 and thus opposite the through opening of the yoke 12. The locking key 23 is pushed through the yoke in the manner shown in FIG. 3 to engage with its forward end the recess forming the projecting portion 26. Because the front wall of the yoke 12 is inclined, and the area of contact of the locking key 23 facing the said front wall also is inclined in the same direction, inward movement of the locking key 23 in the yoke 12 produces a wedge action, such that the stanchion wall portion 15 is urged against the platform edge surface and the attachment against the action of the tongue 20 in the yoke 13. To disconnect the stanchion, the locking key is pushed in the opposite direction so that it goes free of the yoke 12, whereupon the stanchion can be swumg outwardly away from the platform about the tongue 20 and the yoke 13, whereupon the stanchion is readily removed.

In addition to the advantageous transmission of forces from the stanchion to the chassis, which is achieved by the arrangement according to the invention, any forces occurring in the longitudinal direction of the platform, as may occur for example when the platform is tilted, are effectively counteracted in that the stanchion wall portion at 27 with its vertical edge surfaces defining the recess engages the corresponding edge surfaces of the attachment 10.

As has been mentioned before, the present invention transmits the forces from the stanchion to the chassis in an exceedingly advantageous manner. If, in exceptional cases, the projecting portion 22 should not touch the bottom of the opening 11 because the platform edge is inclined, the forces of transmission will of course be less advantageous but, compared to prior constructions, the forces will still be adequately transmitted in that the projecting portion extends into the opening and engages, in the area of its transition to the stanchion surface, the attachment around the opening 11.

I claim:

1. A platform stanchion for detachable mounting to the edge surface of a truck platform comprising, in combination, an attachment plate having a flat wall portion, one face of which is adapted to be permanently secured to the platform edge surface of a truck, an upper yoke projecting from the upper part of the opposite face of the plate and having a vertical through opening, a lower horizontally extending yoke projecting from the lower part of the opposite face thereof and an opening in said plate below the upper yoke that exposes the edge surface of the platform, a stanchion having a wall portion, a tongue on the lower end of the wall portion adapted to be inserted into said lower yoke and an opening in the wall portion located and dimensioned so that it passes over the upper yoke when the tongue of the stanchion is inserted into and pivoted about the lower yoke, said wall portion of the stanchion having a central longitudinally extending raised portion for accommodating the attachment plate so that said raised portion lies against the plate and an offset portion above said raised portion a part of which extends into the opening in the plate for engagement with the platform edge surface and a part of which extends above the upper yoke, said opening in the stanchion wall being located in the offset portion of the wall and a wedge-shaped locking key insertable through the upper yoke that engages with the offset portion of the stanchion wall above and below the upper yoke to clamp the stanchion to the attachment plate.

2. The platform stanchion of claim 1, wherein the lower wall portion of the stanchion also has side walls on either side of said centrally raised wall portion that lie in the same plane as the offset portion of the wall for engagement with the platform edge surface on either side of the attachment plate.

3. The platform stanchion of claim 2, wherein inner side edges of the side walls, at least along a part of their length, lie closely adjacent outer side edges of the attachment plate.

4. The platform stanchion of claim 3, including longitudinally extending reinforcements attached to the side walls of the lower wall portion of the stanchion.

5. The platform stanchion of claim 1, including a pair of guides on the offset portion of the wall above said opening in the stanchion wall and on opposite sides of the upper yoke to guide the locking key into position in the upper yoke.

* * * * *